United States Patent
Karagiannis et al.

(10) Patent No.: US 11,301,626 B2
(45) Date of Patent: Apr. 12, 2022

(54) ARTIFICIAL INTELLIGENCE BASED CONTEXT DEPENDENT SPELLCHECKING

(71) Applicant: International Business Machines Corporation, Armonk, NY (US)

(72) Inventors: Panos Karagiannis, Cambridge, MA (US); Ladislav Kune, Cambridge, MA (US); Saloni Potdar, Arlington, MA (US); Haoyu Wang, Somerville, MA (US); Navneet N. Rao, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/679,464

(22) Filed: Nov. 11, 2019

(65) Prior Publication Data

US 2021/0141860 A1    May 13, 2021

(51) Int. Cl.
| | |
|---|---|
| *G06F 40/232* | (2020.01) |
| *G06N 20/00* | (2019.01) |
| *G06F 40/30* | (2020.01) |
| *G06F 40/284* | (2020.01) |
| *G06F 40/211* | (2020.01) |
| *G06F 40/253* | (2020.01) |

(52) U.S. Cl.
CPC .......... *G06F 40/232* (2020.01); *G06F 40/284* (2020.01); *G06F 40/30* (2020.01); *G06N 20/00* (2019.01); *G06F 40/211* (2020.01); *G06F 40/253* (2020.01)

(58) Field of Classification Search
CPC ........... G06F 40/00–58; G06F 16/3344; G06F 16/215; G06N 20/00

USPC .......... 704/1, 9, 10, 257, 270–275; 715/257
See application file for complete search history.

(56) References Cited

U.S. PATENT DOCUMENTS

| | | |
|---|---|---|
| 7,669,112 B2 | 2/2010 | Bates et al. |
| 8,881,005 B2 * | 11/2014 | Al Badrashiny ..... G06F 40/163 715/257 |
| 8,892,996 B2 | 11/2014 | Unruh |

(Continued)

OTHER PUBLICATIONS

Toutanova et al. "Pronunciation Modeling for Improved Spelling Correction". Proceedings of the 40th Annual Meeting of the Association for Computational Linguistics (ACL), Philadelphia, Jul. 2002, pp. 144-151 (Year: 2002).*

(Continued)

*Primary Examiner* — Jesse S Pullias
(74) *Attorney, Agent, or Firm* — James L. Olsen (57) ABSTRACT

Provided is a method, system, and computer program product for context-dependent spellchecking. The method comprises receiving context data to be used in spell checking. The method further comprises receiving a user input. The method further comprises identifying an out-of-vocabulary (OOV) word in the user input. An initial suggestion pool of candidate words is identified based, at least in part, on the context data. The method then comprises using a noisy channel approach to evaluate a probability that one or more of the candidate words of the initial suggestion pool is an intended word and should be used as a candidate for replacement of the OOV word. The method further comprises selecting one or more candidate words for replacement of the OOV word. The method further comprises outputting the one or more candidates.

20 Claims, 5 Drawing Sheets

(56) References Cited

U.S. PATENT DOCUMENTS

| | | | |
|---|---|---|---|
| 9,015,036 | B2 | 4/2015 | Zangvil et al. |
| 9,218,333 | B2 | 12/2015 | Liensberger |
| 9,275,036 | B2 | 3/2016 | Bodin et al. |
| 9,930,168 | B2 | 3/2018 | Albouyeh et al. |
| 10,083,167 | B2 | 9/2018 | Rangarajan Sridhar |
| 10,176,168 | B2 | 1/2019 | Gao et al. |
| 10,795,938 | B2 * | 10/2020 | Wan .................. G06F 16/90344 |
| 2007/0073532 | A1 | 3/2007 | Brockett et al. |
| 2009/0254819 | A1 | 10/2009 | Song et al. |
| 2010/0275118 | A1 | 10/2010 | Iakobashvili et al. |
| 2015/0142422 | A1 | 5/2015 | Zangvil et al. |
| 2015/0254327 | A1 * | 9/2015 | Patil ........................ G06F 16/13 707/739 |
| 2016/0026962 | A1 | 1/2016 | Shankar et al. |
| 2016/0335244 | A1 * | 11/2016 | Weisman .............. G06F 40/284 |
| 2018/0107643 | A1 * | 4/2018 | Gliozzo ................ G06F 40/232 |
| 2019/0057306 | A1 * | 2/2019 | Xue ....................... G06N 20/00 |
| 2019/0251184 | A1 * | 8/2019 | Shan ....................... G06N 3/084 |
| 2020/0007380 | A1 * | 1/2020 | Chen .................... H04L 41/046 |
| 2020/0285687 | A1 * | 9/2020 | Zhang ................. G06F 16/9538 |

OTHER PUBLICATIONS

Paul Cook and Suzanne Stevenson. "An unsupervised model for text message normalization", Proceedings of the workshop on computational approaches to linguistic creativity. Association for Computational Linguistics, 2009 (Year: 2009).*

Bo Han and Timothy Baldwin. "Lexical normalisation of short text messages: Makn sens a# twitter", Proceedings of the 49th Annual Meeting of the Association for Computational Linguistics: Human Language Technologies—vol. 1. Association for Computational Linguistics, 2011 (Year: 2011).*

Chollampatt et al., "A Multilayer Convolutional Encoder-Decoder Neural Network for Grammatical Error Correction," www.aaai.org/ocs/index.php/AAAI/AAAI18/paper/viewFile/17308/16137, The Thirty-Second AAAI Conference on Artificial Intelligence (AAAI-18), pp. 5755-5762, ©2018.

Chollampatt et al., "Neural Quality Estimation of Grammatical Error Correction," http://aclweb.org/anthology/D18-1274, Proceedings of the 2018 Conference on Empirical Methods in Natural Language Processing, pp. 2528-2539.

Fossati, et al., "I saw TREE trees in the park: How to correct real-word spelling mistakes," http://www.lrec-conf.org/proceedings/lrec2008/pdf/227_paper.pdf, accessed Aug. 1, 2019, pp. 896-901.

Ge et al., "Reaching Human-Level Performance in Automatic Grammatical Error Correction: An Empirical Study," Microsoft Research Technical Report, arxiv.org/pdf/1807.01270.pdf, arXiv:1807.01270v5 [cs CL], Jul. 11, 2018, 15 pgs.

Ghosh et al., "Neural Networks for Text Correction and Completion in Keyboard Decording," https://arxiv.org/pdf/1709.06429.pdf, Aug. 2015, pp. 1-14.

Grundkiewicz et al., "Near Human-Level Performance in Grammatical Error Correction with Hybrid machine Translation," http://aclweb.org/anthology/N18-2046, Proceedings of NAACL-HLT 2018, pp. 284-290, ©2018 Association for Computational Linguistics.

Lewis, G. "Sentence Correction using Recurrent Neural Networks," https://cs224d.stanford.edu/reports/Lewis.pdf, accessed Aug. 1, 2019, pp. 1-7.

Mell et al., "The NIST Definition of Cloud Computing," Recommendations of the National Institute of Standards and Technology, U.S. Department of Commerce, Special Publication 800-145, Sep. 2011, 7 pgs.

Sharma et al., "A correction model for real-word errors," https://reader.elsevier.com/reader/sd/pii/S1877050915032111?token=238B2 53F2DA25602950CD4EBD70F82CB699CCE398730DE336FCB9 F0B6F1F9AC32F7A942A1AEC82B75 C7FABB7EC1C6FC8, ©2015 The Authors. Published by Elsevier B.V., 8 pgs.

Whitelaw et al., "Using the Web for Language Independent Spellchecking and Autocorrection," https://pdfs.semanticscholar.org/0249/a0a9ff82a83989f770df03d8abdc32312fd6.pdf, Proceedings of the 2009 Conference on Empirical Methods in Natural Language Processing, pp. 890-899, Aug. 2009, 10 pgs.

* cited by examiner

ARTIFICIAL INTELLIGENCE BASED CONTEXT DEPENDENT SPELLCHECKING

BACKGROUND

The present disclosure relates to spellchecking, and more specifically, to artificial intelligence based context dependent spellchecking.

Many utterances contain misspellings of words that obfuscate the meaning intended by the words and/or of a sentence they are contained within. Automatic spellchecking is present in various forms and can include dictionary-based approaches such as Hunspell and Aspell, which are integrated into a variety of software programs.

SUMMARY

Disclosed herein are embodiments of a method, system, and computer program product for context-dependent spellchecking. The method comprises receiving context data to be used in spell checking. The method further comprises receiving a user input. The user input may comprise an utterance. The method further comprises identifying an out-of-vocabulary (OOV) word in the user input. An initial suggestion pool of candidate words is identified based, at least in part, on the context data. The method then comprises using a noisy channel approach to evaluate a probability that one or more of the candidate words of the initial suggestion pool is an intended word and should be used as a candidate for replacement of the OOV word. The noisy channel approach comprises a language model and an error model. The method further comprises selecting one or more candidate words for replacement of the OOV word. The method further comprises outputting the one or more candidates.

Further embodiments include a method, system, and computer program product for context-dependent spellchecking. The method comprises receiving context data to be used in spell checking. The method further comprises receiving a user input. The user input may comprise an utterance. The method further comprises identifying an out-of-vocabulary (OOV) word in the user input based, at least in part, on the context data. An initial suggestion pool of candidate words is identified. The method then comprises determining a probability that one or more of the candidate words of the initial suggestion pool is an intended word and should be used as a candidate for replacement of the OOV word. The method further comprises selecting one or more candidate words for replacement of the OOV word. The method further comprises outputting the one or more candidates.

According to various embodiments described herein, a system may be provided comprising a processor for implementing the above-described method operations. Furthermore, various embodiments may take the form of a related computer program product, accessible from a computer-usable or computer-readable medium providing program code for use, by, or in connection, with a computer or any instruction execution system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to spellchecking, and more particular aspects relate to artificial intelligence based context dependent spellchecking for use in a virtual assistant. While the present disclosure is not necessarily limited to such applications, various aspects of the disclosure may be appreciated through a discussion of various examples using this context.

Many written utterances contain misspellings of words that obfuscate the meaning intended by the words and/or of a sentence they are contained within. As a result, it can become harder to use these sentences in other downstream tasks that involve text analysis, including natural language processing. When misspelled words are analyzed by a service, such as a chatbot, the service can be unable to assist a user or provide inaccurate results. Automatic spellchecking is present in various forms and can include dictionary-based approaches such as Hunspell and Aspell, which are integrated into a variety of software programs. However, the context of words, including both the phrase, sentence, or other nearby words, as well as the context of the situation (e.g., a service such as a chatbot) can improve spellchecking and/or correcting accuracy in ways a dictionary-based approach cannot. As used herein, "spellchecking," "spellchecks," and the like should be interpreted to include the concepts of checking spelling, suggesting corrections for spelling, and automatically correcting spelling, unless noted otherwise or the context dictates otherwise.

Statistical machine translation (SMT) techniques can be used in spellchecking. Such systems attempt to provide more elaborate suggestions or corrections of misspelled words by taking into account the context within which a specific misspelling is occurring. This can be a particularly difficult problem, since it can be difficult to programmatically encode the semantic meaning of context. SMT approaches can use either phonetic information or edit distance information in an error model. Additionally, deep neural networks can be able to fix complex grammatical errors as well as misspellings. These systems can achieve improved performance but come with a heavy computational burden.

Disclosed herein is a method, system, and computer program product for artificial intelligence based context dependent spellchecking, which can be designed to work in the context of a virtual assistant (e.g., a chatbot) and can be specifically tailored into improving text classification accuracy for utterances that contain orthographical errors. Such a method can include receiving context data (such as data to be used by the virtual assistant). It can continue by receiving and processing a user input (such as a request addressed to the virtual assistant). The method can identify out of vocabulary (OOV) words including identifying generally misspelled words (i.e., words not in the language of input) and allowing for any words specific to the application at hand to be excluded from being characterized as an OOV or misspelled word (e.g., relevant company names or abbreviations will not be identified as misspellings). An initial suggestion pool for each OOV word can be identified and a noisy channel approach can be initiated. The method can use a noisy channel approach which comprises a plurality of models for identifying replacement words. This can be a language model which can use n-gram context and an error model which incorporates phonetic similarity, probabilistic edit distance, and neural embeddings. The noisy channel approach can model the probability of a word correction as the product of two distributions (the language model distribution and the error model distribution). Using the results, the method can select a candidate for replacement of the OOV word and repeat this process for each OOV word. In some embodiments, one or more OOV words may not have a candidate selected. Additional processing to remove any profanities, controversial words, or objectionable candidates can be used in some embodiments. The output of the candidate can be provided to a user and/or automatically substituted into the user input. This can be further used within the context as appropriate.

Compared to known techniques, the method, system, and computer program product described herein, including its use of a noisy channel approach with a product of two distributions (language model distribution and error model distribution), may achieve many advantages. For example, the teachings presented herein provide for increased scalability and accuracy of word replacement generation by combining these various techniques and calculating a product of the distributions. Additionally, by incorporating the context of utterances, performance can be improved by allowing for context specific utterances and thus limiting overcorrection of utterances which contain acronyms, proper names, or other context specific terms which could be mistakenly identified as misspellings by a traditional context ignorant system. These improvements and/or advantages are a non-exhaustive list of example advantages. Embodiments of the present disclosure exist which can contain none, some, or all of the aforementioned advantages and/or improvements.

Figure 1:
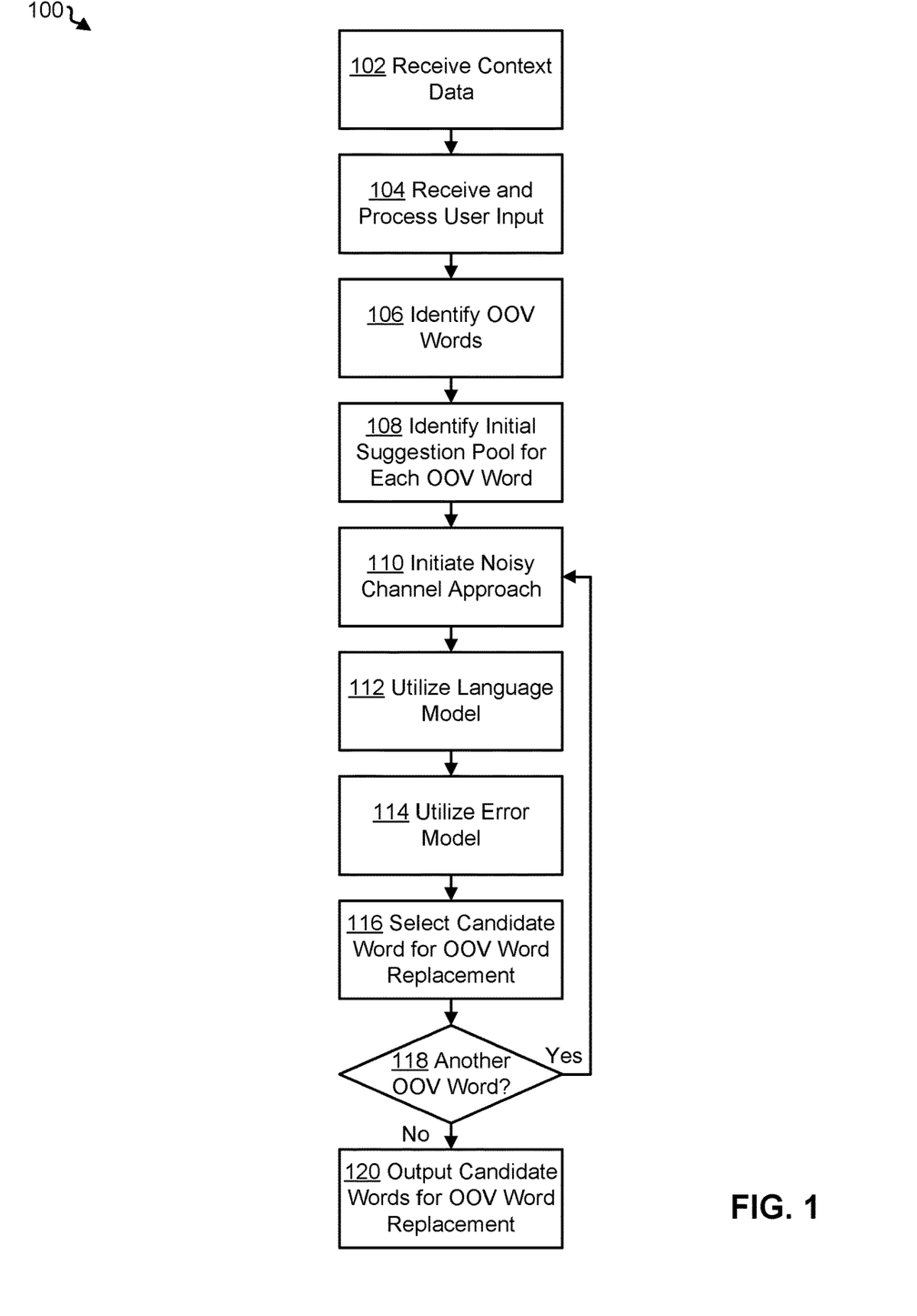
FIG. 1 depicts a flowchart of an example method for artificial intelligence based context dependent spellchecking, in accordance with some embodiments of the present disclosure.

FIG. 1 depicts an example method 100 for artificial intelligence based context dependent spellchecking, in accordance with embodiments of the present disclosure. Method 100 can include more or fewer operations than those depicted. Method 100 can include operations in different orders than those depicted. The following discussion will refer to method 100 being performed by a spellchecking service. It is to be understood that the spellchecking service can be implemented by (and, hence, method 100 can be performed by) a computer system (such as computer system 300 depicted in FIG. 3), a collection of computers, one or more virtual machines (including running on a cloud platform), a component of a computer, or firmware or other software running on a computer. In some embodiments, method 100 can be performed by or performed using a natural language processing environment (such as natural language processing environment 200 depicted in FIG. 2). In some embodiments, the spellchecking service can be applied locally, while in others it can be deployed as a service (including over a network and/or using cloud technology).

Method 100 begins at operation 102 where the spellchecking service receives context data. Context data can vary in embodiments and may depend on the environment in which the spellchecking service is to be deployed. For example, if the spellchecking service is for use by a virtual assistant (e.g., a chatbot), context data may take the form of the corpus of data for use by the virtual assistant. In some embodiments, this can be the training data supplied to the virtual assistant during training of the virtual assistant. In other embodiments, the context data can be a corpus of data for a program, database, or other repository of information which can accept user input. The context data can be added to a dictionary of words to use by the spellchecking service and/or to suggestion pools for replacement words to be used by the spellchecking service. Operation 102 may be performed a limited number of times (i.e., not with every performance of method 100), such as when a spellchecking service is first initialized and/or any times additional context data is added to a virtual assistant or other environment in which the spellchecking service is to be deployed.

In some embodiments, context data can grow over time as new context data is input. For example, in the situation of a virtual assistant, in addition to the corpus of data for use by the virtual assistant such as training data, the context data may include words from logs of user interactions with the virtual assistant. In such embodiments, the context data may not include all words used by users (in order to avoid adding misspellings to the context data and to prevent a user or malicious actor from thereby adding undesirable words to the context data), but may include words which are used by users with a certain frequency, a certain amount of time, or otherwise indicate a level of usage which is not consistent with misspelling. This may indicate that a new word, including a slang word or word for newly discovered technology, has developed or has been left out of the context data. In some embodiments, an administrator or other person may be required to approve adding such words to the context data, and a list of such words could be presented to the administrator.

At operation 104, the spellchecking service receives and processes a user input. If the spellchecking service is used as part of or in conjunction with a virtual assistant, this can take the form of a user asking a question of the virtual assistant or otherwise inputting words. A user input can take other forms depending on the environment in which the spellchecking service is used, but will be in the format of one or more words, or utterances which can be converted to words. Processing this user input can include tokenizing the user input into individual words or phrases, using a part of speech tagger, and/or performing other natural language processing on the user input (such as by using natural language processing environment 200 depicted in FIG. 2). In some embodiments, in addition to, or instead of, spellchecking for individual words, token based methods can be used, and references herein to word(s) can also apply to tokens where appropriate.

At operation 106, the spellchecking service identifies out of vocabulary (OOV) words in the user input. This can include identifying generally misspelled words (i.e., words not in the language of input) followed by allowing for any words which are part of the received context data at operation 102 to be excluded from being characterized as an OOV or misspelled word (e.g., relevant company names or abbreviations will not be identified as misspellings). In other embodiments, the received context data can be added to the vocabulary (e.g., a dictionary or word list), such that user inputted words which match words in the context data are not characterized as misspelled. In some embodiments, the context data received at operation 102 may be processed so as to ensure the words contained within it are correctly spelled such that misspellings in the context data do not affect the spellchecking service (e.g., if "teh" was mistakenly included once in the context data instead of "the," processing the context data could avoid the spellchecking service ignoring all misspellings of "the" as "teh" when provided as a user input). This could include receiving user input (e.g., from an administrator inputting training data) regarding words in the context data to add to the vocabulary, adding words which are present a number of times exceeding a threshold, or other way of processing the context data.

This expanded vocabulary can limit overcorrection of domain specific terms entered by a user. For example, a general purpose spellchecker would be likely to correct "adb" to "add," but in a setting of a virtual assistant designed for suggesting car parts and which contains the word "adb" as part of the training data, at operation 106 the spellchecking service would identify the word "adb" as being part of the received context data (e.g., included therein as an acronym for Adaptive Driving Beam headlights). As a result, the spellchecking service would not identify "adb" as an OOV word or a misspelling, and thus would not correct it later in the method, even though it could otherwise be considered a misspelling without proper context. In some embodiments, the spellchecking service can exempt words within quotes, words containing special characters, numbers, emojis, or other types of input from identification as OOV, or otherwise provide special treatment to such inputs.

In some embodiments, the spellchecking service may utilize a plurality of different context data for different context. The spellcheck service may choose which context data to utilize based on the conversation. For example, a virtual assistant may analyze the user's question ("how to read OBD code for 2005 SUV"), determine that it is related to cars, and load the car-specific context data. Because the spellchecking service is utilizing a car-related context data, it may recognize that OBD is not a typo At operation 108, the spellchecking service identifies an initial suggestion pool for each OOV word. The initial suggestion pool can be a large pool (e.g., 200,000 words) of possible words to choose from and can in some embodiments be a vocabulary or dictionary of all words in the language of the spellchecking service (or languages if the spellchecking service is used in an environment where user inputs in multiple languages are accepted). In other embodiments, the initial suggestion pool can be a smaller pool of the most commonly used words to decrease the time involved in modeling for each word. The initial suggestion pool can also include words from the received context data so as to allow for suggestions of context dependent acronyms, proper nouns, or other context specific words. In some embodiments, the initial suggestion pool can have objectionable words removed from it (e.g., profanity or slang) such that these words are not suggested to users as potential replacements or automatically replaced into a user input.

At operation 110, a noisy channel approach can be initiated. The noisy channel approach can seek to determine the probability that any given word is the intended word which has been misspelled and appears in the user input as an OOV word. Using these probabilities, a best candidate or candidates can be selected or ranked which can best remove the "noise" from the user's input to reach the intended input or most likely intended input. In other embodiments, a candidate can be selected other than a "best" candidate on bases such as frequency, first candidate identified, or otherwise. The method can use a noisy channel approach which comprises a plurality of models for identifying replacement words. The noisy channel approach can comprise both a language model which is utilized in operation 112 and an error model which is utilized in operation 114. Ultimately, the noisy channel approach can model the probability of a word correction as the product of two distributions (the language model distribution and the error model distribution).

At operation 112, the spellchecking service utilizes the language model. The language model can be a statistical language model and can be a probability distribution over sequences of words. Given such a sequence, say of length m, it can assign a probability $P(w_1, \ldots, w_m)$ to the whole sequence. Determining the probability of a word occurring in a sequence of words can be used in spellchecking to determine which word an OOV word was intended to be if it was not misspelled or otherwise entered incorrectly. The language model can be an n-gram model, which uses the context of an n-gram (a contiguous sequence of n words in an utterance) for predicting the next item in such a sequence by using the (n−1) words which precede a word in question. The language model provides context to distinguish between words and phrases that sound similar by using the context of the preceding words in the utterance.

At operation 114, the spellchecking service utilizes the error model. The error model can be a distribution which models the probability that a given error has occurred in an utterance such as the user input received at operation 104. In operation 114, the error model can contain a plurality of error models including phonetic similarity models, probabilistic edit distance models, and neural embeddings models. A phonetic similarity model can use a phonetic algorithm for indexing words by their pronunciation or how they should sound when spoken. The nature of the phonetic similarity model may depend on the language(s) used by the spellchecking service. In some embodiments, the phonetic similarity model can be a metaphone or double metaphone algorithm. Using one of these algorithms, the spellchecking service can take an incorrectly spelled word (i.e., an OOV word identified at operation 106) and create one or more codes (e.g., one code for a metaphone algorithm, two codes for a double metaphone algorithm). The code(s) can then be looked up in a directory for words with the same or similar metaphone. Words that have the same or similar metaphone can become possible alternative spellings to narrow down the initial suggestion pool to a smaller pool of candidates and/or identify the probability of each word in the pool with the highest probabilities being those with the same or most similar metaphones.

A probabilistic edit distance model can also be used as part of the error model. Edit distance is a way of quantifying how dissimilar two strings (e.g., words) are to one another by counting the minimum number of operations required to transform one string into the other. The probability that a candidate word for replacing an OOV word is the best candidate is higher with a lower number of edits required to transform the OOV word into the candidate word. For example, transforming the word manager to manger requires a low number of edits (i.e., removing the second a), whereas transforming manager to mangy requires a higher number of edits (i.e., removing the second a, the e, the r, and adding a y). In some edit distance models, replacing a letter or letters may be one edit, while in other models it may be two or more edits (removing and adding). Various edit distance models are capable of being used in the context of this disclosure.

A third model which can be used as part of the error model is a neural embeddings model. Embedding is a method which can be used to represent discrete variables (such as words) as continuous vectors. The embedding distance, which can take the form of a cosine distance, can be a representation of how similar two words are. Pairs of words which are similar will have a small embedding distance between them, while dissimilar words will have a greater distance between them. The embeddings for words can be generated using a neural network and training data. An average-pooled embedding distance of an original sequence and suggested candidate sequence can be used along with edit distance and phonetic similarity to score the suggested correction.

These three models (or in some embodiments fewer or additional models), can be combined together to generate an overall (e.g., ensemble) error model. This combination can vary in embodiments. In some embodiments, each model can be performed on the entire initial suggestion pool and probabilities for each word can be combined (e.g., averaged, highest value for each word used, median). An overall score of suggested candidates can be combined from edit distance, phonetic similarity, and neural embeddings models. Using these combined probabilities, the most likely word(s) can be identified (i.e., the word(s) with the highest probabilities).

At operation 116, the spellchecking service selects a candidate for OOV word replacement. The results of the error model and the language model can be combined, which can occur by taking a product of the two distributions which are generated, to reach a final distribution combining the results of all of the models used to achieve increased accuracy. In some embodiments, the word from the initial suggestion pool which has the highest probability in the product of distributions can be selected as the candidate for replacing the OOV word. In some embodiments, a small number of candidates (e.g., 2 to 10 words) can be selected. In some embodiments, an optional step can be implemented where, after the product of the two distributions is generated, a smaller pool of words can be identified (e.g., 30 words) and one or more of the language model, error model, or sub-models within the error model can be performed again using the smaller pool, before selecting a candidate or candidates. In some embodiments, one or more OOV words may not yield a selection of a candidate for replacement. This could occur if no candidates have a probability over a threshold probability value.

At operation 118, the spellchecking service determines whether there are one or more additional OOV words. If additional OOV words which have not had a candidate selected are present, method 100 returns to operation 110 to perform spellchecking using the noisy channel approach.

If no additional OOV words remain, method 100 proceeds to operation 120, where the spellchecking service outputs the candidate(s) for OOV word replacement. Additional processing to remove any profanities, controversial words, or objectionable candidates can be used before outputting in some embodiments. The output of the candidate can be provided to a user and/or automatically substituted into the user input. Multiple candidates can be displayed to a user as possible replacements for the identified OOV word to allow the user to choose a replacement. These could be ranked by their probabilities and displayed in an ordered manner (e.g., highest likelihood placed highest or in a most prominent location). This output can be further used within the context as appropriate (e.g., supplied to a virtual assistant in order to return an answer to the user input). In some embodiments, one or more OOV words may not result in candidates for OOV word replacement (e.g., the spellchecking service cannot determine candidates). In such embodiments, these one or more OOV words may not have a corresponding output and the OOV word can remain as is. After operation 120, method 100 ends.

Figure 2:
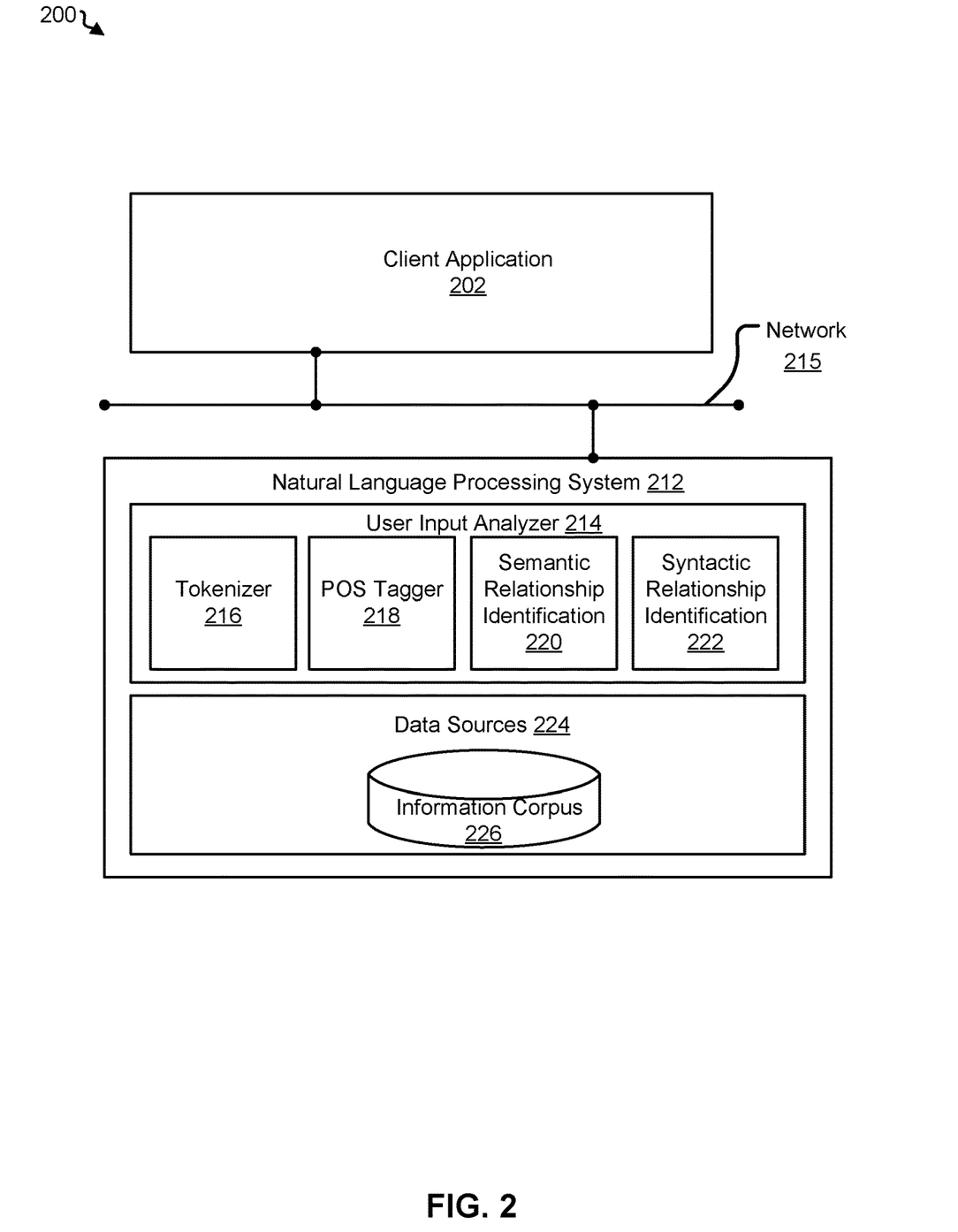
FIG. 2 depicts a natural language processing system, in accordance with some embodiments of the present disclosure.

FIG. 2 depicts a natural language processing environment 200, in accordance with embodiments of the present disclosure. Aspects of FIG. 2 are directed toward an exemplary natural language processing environment 200 in performance of method 100, particularly with regard to operation 104 involving receiving and processing user input. Natural language processing environment 200 can be remote from the computer performing method 100 and connected e.g., by cloud technology. In other embodiments, natural language processing environment 200 can be a part of or otherwise connected to a computer system, such as computer system 300 of FIG. 3. Natural language processing system 212 can perform methods and techniques for responding to the requests sent by one or more client applications 202. In certain embodiments, the information received at natural language processing system 212 may correspond to input documents received from users or websites, where the input documents may be expressed in a free form and in natural language.

In certain embodiments, client application 202 and natural language processing system 212 can be communicatively coupled through network 215 (e.g., the Internet, intranet, or other public or private computer network). In certain embodiments, natural language processing system 212 and client application 202 may communicate by using Hypertext Transfer Protocol (HTTP) or Representational State Transfer (REST) calls. In certain embodiments, natural language processing system 212 may reside on a server node. Client application 202 may establish server-client communication with natural language processing system 212 or vice versa. In certain embodiments, the network 215 can be implemented within a cloud computing environment or using one or more cloud computing services. Consistent with various embodiments, a cloud computing environment can include a network-based, distributed data processing system that provides one or more cloud computing services.

Consistent with various embodiments, natural language processing system 212 may respond to information sent by client application 202 (e.g., user input provided by users). Natural language processing system 212 can analyze the received user input. In certain embodiments, natural language processing system 212 may include a user input analyzer 214 and data sources 224. User input analyzer 214 can be a computer module that analyzes the received user inputs. In certain embodiments, user input analyzer 214 can perform various methods and techniques for analyzing the user inputs syntactically and semantically. In certain embodiments, user input analyzer 214 can parse received user inputs. User input analyzer 214 may include various modules to perform analyses of received user inputs. For example, computer modules that user input analyzer 214 may encompass include, but are not limited to, a tokenizer 216, part-of-speech (POS) tagger 218, semantic relationship identification 220, and syntactic relationship identification 222. In certain embodiments, the user input analyzer 214 can include using a natural language processing technique.

Consistent with various embodiments, tokenizer 216 may be a computer module that performs lexical analysis. Tokenizer 216 can convert a sequence of characters into a sequence of tokens. Tokens may be string of characters typed by a user and categorized as a meaningful symbol. Further, in certain embodiments, tokenizer 216 can identify word boundaries in an input user input and break the user input or any text into its component parts such as words, multiword tokens, numbers, and punctuation marks. In certain embodiments, tokenizer 216 can receive a string of characters, identify the lexemes in the string, and categorize them into tokens.

Consistent with various embodiments, POS tagger 218 can be a computer module that marks up a word in a text to correspond to a particular part of speech. POS tagger 218 can read a user input or other text in natural language and assign a part of speech to each word or other token. POS tagger 218 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously provided user inputs. Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs (e.g., when, where, why, whence, whereby, wherein, whereupon), conjunctions, determiners, negative particles, possessive markers, prepositions, wh-pronouns (e.g., who, whom, what, which, whose), and the like. In certain embodiments, POS tagger 218 can tag or otherwise annotate tokens of a user input with part of speech categories. In certain embodiments, POS tagger 218 can tag tokens or words of a user input to be parsed by natural language processing system 212.

Consistent with various embodiments, semantic relationship identification 220 may be a computer module that can identify semantic relationships of recognized identifiers in user inputs provided by users. For example, the semantic relationship identification 220 may include identifying recognized identifiers such as authors, websites, types of user inputs, user input sources, institutions, corporations, and other entities. In certain embodiments, semantic relationship identification 220 may determine functional dependencies between entities, the dimension associated to a member, and other semantic relationships.

Consistent with various embodiments, syntactic relationship identification 222 may be a computer module that can identify syntactic relationships in a user input composed of tokens provided by users to natural language processing system 212. Syntactic relationship identification 222 can determine the grammatical structure of sentences, for example, which groups of words are associated as "phrases" and which word is the subject or object of a verb. In certain embodiments, syntactic relationship identification 222 can conform to a formal grammar.

In certain embodiments, user input analyzer 214 may be a computer module that can parse a received user input and generates a corresponding data structure of the user input. For example, in response to receiving a user input at natural language processing system 212, user input analyzer 214 can output the parsed user input as a data structure. In certain embodiments, the parsed user input may be represented in the form of a parse tree or other graph structure. To generate the parsed user input, user input analyzer 214 may trigger computer modules 216-222. User input analyzer 214 can use functionality provided by computer modules 216-222 individually or in combination. Additionally, in certain embodiments, user input analyzer 214 may use external computer systems for dedicated tasks that are part of the user input parsing process.

Consistent with various embodiments, the output of user input analyzer 214 can be used by natural language processing system 212 to perform a search of one or more data sources 224 to identify classifications for the user input. In certain embodiments, data sources 224 may include data warehouses, information corpora, data models, and word repositories. In certain embodiments, the data source(s) 224 can include an information corpus 226. The information corpus 226 can enable data storage and retrieval. In certain embodiments, the information corpus 226 may be a storage mechanism that houses a standardized, consistent, clean and integrated form of data. The data may be sourced from various operational systems. Data stored in the information corpus 226 may be structured in a way to specifically address reporting and analytic requirements. In one embodiment, the information corpus may be a relational database. In some example embodiments, data sources 224 may include one or more user input repositories.

The various components of the exemplary natural language processing system described above may be used to implement various aspects of the present disclosure. For example, the client application 202 could be used to receive one or more user inputs. The user input analyzer 214 could, in certain embodiments, use a natural language processing technique to analyze the user input, and identify keywords and word relationships in the user input. Further, the natural language processing system 212 could, in certain embodiments, compare the keywords to an information corpus 226 to determine keywords which correspond to classifications for user inputs.

Figure 3:
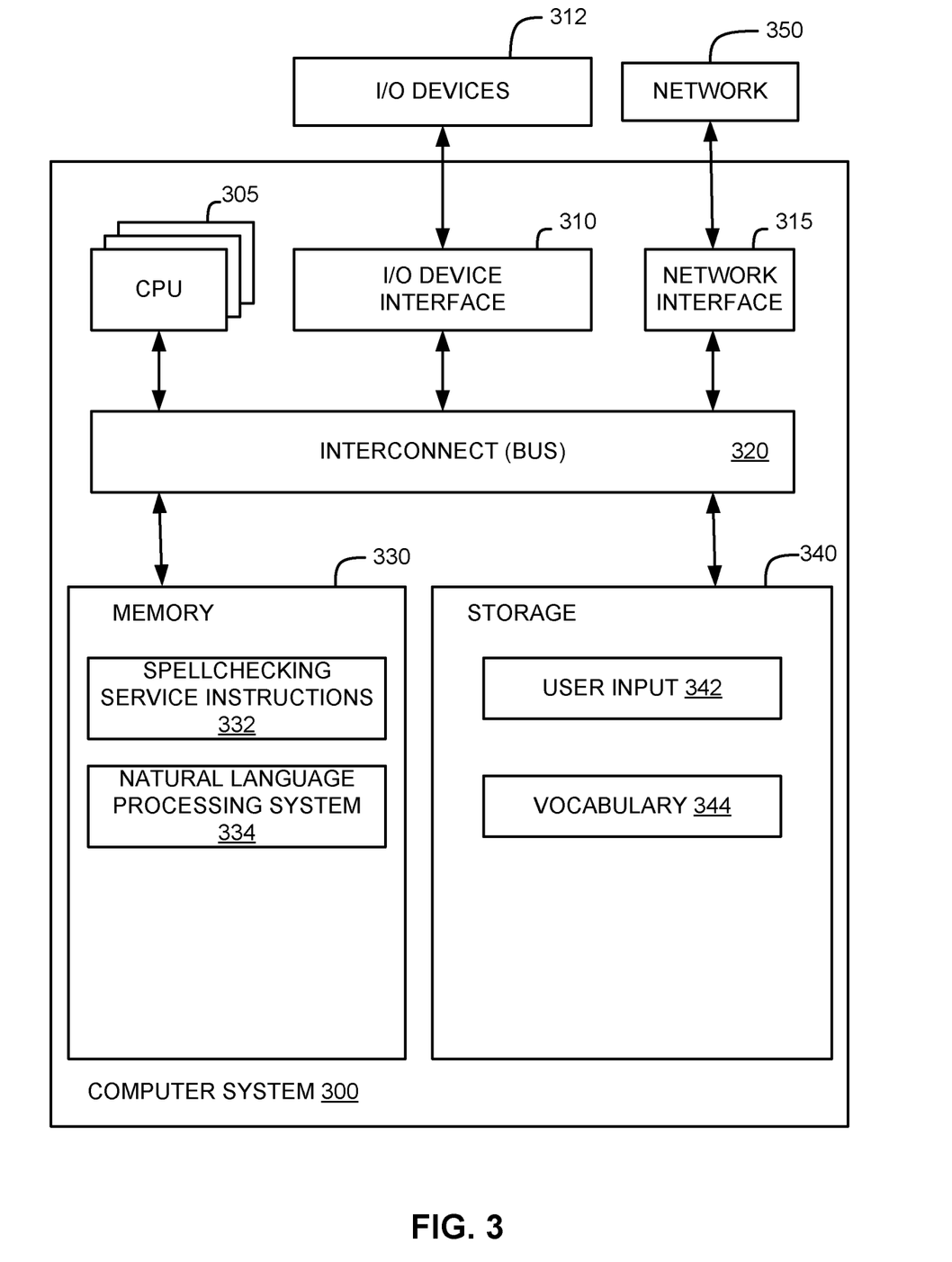
FIG. 3 illustrates a block diagram of a computer system, in accordance with some embodiments of the present disclosure.

Referring now to FIG. 3, illustrated is a block diagram of a computer system 300, in accordance with some embodiments of the present disclosure. In some embodiments, computer system 300 performs operations in accordance with FIG. 1 as described above. The computer system 300 can include one or more processors 305 (also referred to herein as CPUs 305), an I/O device interface 310 which can be coupled to one or more I/O devices 312, a network interface 315, an interconnect (e.g., BUS) 320, a memory 330, and a storage 340.

In some embodiments, each CPU 305 can retrieve and execute programming instructions stored in the memory 330 or storage 340. The interconnect 320 can be used to move data, such as programming instructions, between the CPUs 305, I/O device interface 310, network interface 315, memory 330, and storage 340. The interconnect 320 can be implemented using one or more busses. Memory 330 is generally included to be representative of a random access memory (e.g., static random access memory (SRAM), dynamic random access memory (DRAM), or Flash).

In some embodiments, the memory 330 can be in the form of modules (e.g., dual in-line memory modules). The storage 340 is generally included to be representative of a nonvolatile memory, such as a hard disk drive, solid state device (SSD), removable memory cards, optical storage, or flash memory devices. In an alternative embodiment, the storage 340 can be replaced by storage area-network (SAN) devices, the cloud, or other devices connected to the computer system 300 via the I/O devices 312 or a network 350 via the network interface 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or more methods consistent with embodiments of the present disclosure.

The memory 330 of computer system 300 includes spellchecking service instructions 332 and natural language processing system 334. Spellchecking service instructions 332 can be an application or compilation of computer instructions for artificial intelligence based context dependent spellchecking. Spellchecking service instructions 332 can be computer instructions for performing method 100 as described above with regard to FIG. 1.

Natural language processing system 334 can be an application or compilation of computer instructions for performing natural language processing. Natural language processing system 334 can be consistent with natural language processing system 212 of FIG. 2 and can be involved in performing operations of FIG. 1, particularly operation 104 as discussed above.

Storage 340 contains user input 342 and vocabulary 344. User input 342 can be the user input received by the computing system 300, such as at operation 104 of method 100. User input 342 can also be the processed user input after processing is performed. User input 342 can be one or more utterances which may contain orthographical errors which require spellchecking and/or correcting.

Vocabulary 344 can be one or more repositories of words to be used by a spellchecking system. Vocabulary 344 can be a dictionary of all words of a language to be used by a spellchecking service, and can have context dependent words added to the vocabulary, such as at operation 102 of method 100. In some embodiments, context data may be stored separately from vocabulary 344.

In some embodiments as discussed above, the memory 330 stores spellchecking service instructions 332 and natural language processing system 334, and the storage 340 stores user input 342 and vocabulary 344. However, in various embodiments, each of the spellchecking service instructions 332, natural language processing system 334, user input 342, and vocabulary 344 are stored partially in memory 330 and partially in storage 340, or they are stored entirely in memory 330 or entirely in storage 340, or they are accessed over a network 350 via the network interface 315.

In various embodiments, the I/O devices 312 can include an interface capable of presenting information and receiving input. For example, I/O devices 312 can receive input from a user and present information to a user and/or a device interacting with computer system 300. In some embodiments, I/O devices 312 can include a display and/or an audio speaker for presenting information to a user of computer system 300.

The network 350 can connect (via a physical or wireless connection) the computer system 300 with other networks, and/or one or more devices that interact with the computer system.

Logic modules throughout the computer system 300—including but not limited to the memory 330, the CPUs 305, and the I/O device interface 310—can communicate failures and changes to one or more components to a hypervisor or operating system (not depicted). The hypervisor or the operating system can allocate the various resources available in the computer system 300 and track the location of data in memory 330 and of processes assigned to various CPUs 305. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
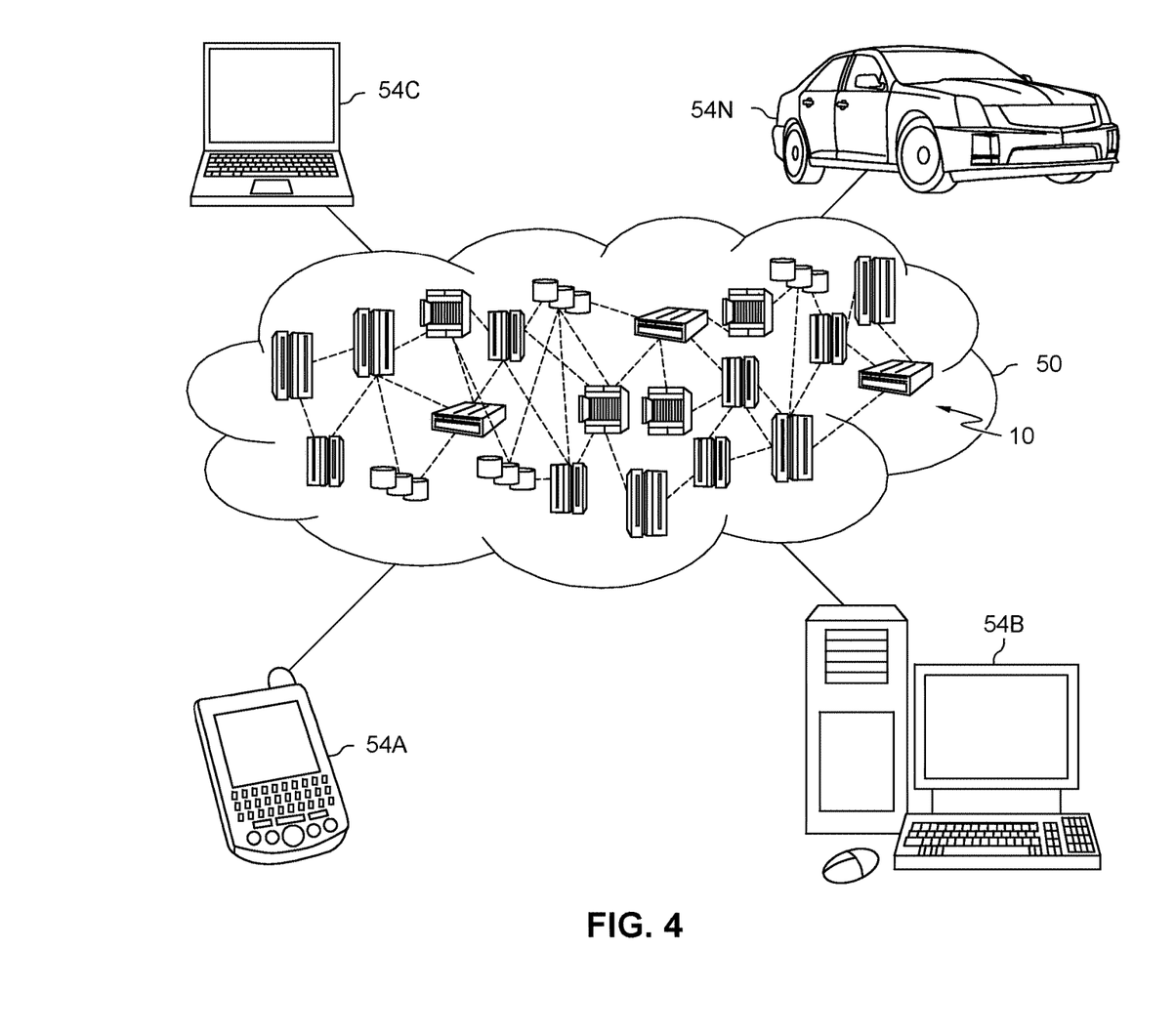
FIG. 4 depicts a cloud computing environment according to some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
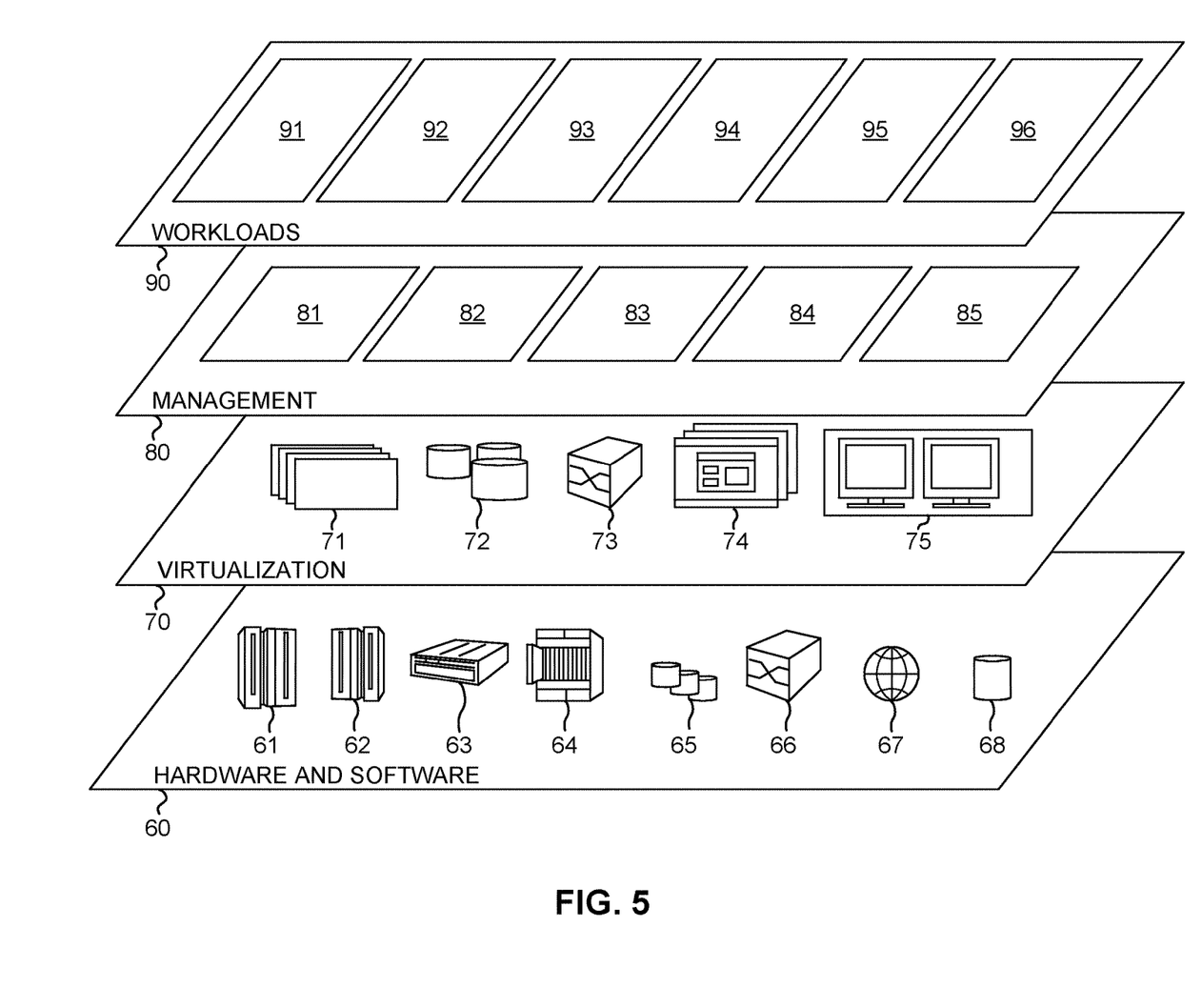
FIG. 5 depicts abstraction model layers according to some embodiments of the present disclosure.

Referring now to FIG. 5, a set of functional abstraction layers provided by cloud computing environment 40 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and artificial intelligence based context dependent spellchecking 96. Artificial intelligence based context dependent spellchecking 96 can be a workload or function such as that described in FIG. 1 above. In other embodiments, only a portion of the artificial intelligence based context dependent spellchecking 96 may be cloud based, such as a natural language processing system as depicted in FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A method for artificial intelligence based context dependent spellchecking, the method comprising:
    receiving context data to be used in spell checking;
    receiving a user input, wherein the user input comprises an utterance;
    identifying an out-of-vocabulary (OOV) word in the user input;
    identifying an initial suggestion pool of candidate words based, at least in part, on the context data;
    using a noisy channel approach comprising a language model and an error model to evaluate a probability that each of one or more of the candidate words of the initial suggestion pool is an intended word and should be used as a candidate for replacement of the OOV word;
    identifying a second pool of candidate words based on the noisy channel approach, each candidate word within the second pool having a probability exceeding a threshold probability value;
    performing, in response to the identifying, at least the language model or error model on the second pool of candidate words a second time;
    selecting, based on results of the performing, one or more candidates for replacement of the OOV word; and
    outputting one or more candidates for replacement of the OOV word.

2. The method of claim 1, wherein the context data is training data for a virtual assistant.

3. The method of claim 2, wherein outputting the one or more candidates for replacement of the OOV word further comprises:
    replacing the OOV word with one of the one or more candidates for replacement in the utterance of the user input; and
    providing the utterance containing the one of the one or more candidates for replacement to the virtual assistant.

4. The method of claim 1, wherein the noisy channel approach uses the product of a language model distribution and an error model distribution.

5. The method of claim 1, wherein the error model comprises a phonetic similarity model, a probabilistic edit distance model, and a neural embeddings model.

6. The method of claim 5, wherein the neural embeddings model uses cosine distances between words in the initial suggestion pool to identify candidate words.

7. The method of claim 1, wherein the initial suggestion pool includes words contained within the received context data.

8. A system for artificial intelligence based context dependent spellchecking, the system comprising:
    one or more processors; and
    a memory communicatively coupled to the one or more processors,
    wherein the memory comprises instructions which, when executed by the one or more processors, cause the one or more processors to perform a method comprising:
    receiving context data to be used in spell checking;
    receiving a user input, wherein the user input comprises an utterance;
    identifying an out-of-vocabulary (OOV) word in the user input;
    identifying an initial suggestion pool of candidate words based, at least in part, on the context data;
    using a noisy channel approach comprising a language model and an error model to evaluate a probability that each of one or more of the candidate words of the initial suggestion pool is an intended word and should be used as a candidate for replacement of the OOV word;
    identifying a second pool of candidate words based on the noisy channel approach, each candidate word within the second pool having a probability exceeding a threshold probability value;
    performing, in response to the identifying, at least the language model or error model on the second pool of candidate words a second time;
    selecting, based on results of the performing, one or more candidates for replacement of the OOV word; and
    outputting one or more candidates for replacement of the OOV word.

9. The system of claim 8, wherein the context data is training data for a virtual assistant.

10. The system of claim 9, wherein outputting the one or more candidates for replacement of the OOV word further comprises:
    replacing the OOV word with one of the one or more candidates for replacement in the utterance of the user input; and
    providing the utterance containing the one of the one or more candidates for replacement to the virtual assistant.

11. The system of claim 8, wherein the noisy channel approach uses the product of a language model distribution and an error model distribution.

12. The system of claim 8, wherein the error model comprises a phonetic similarity model, a probabilistic edit distance model, and a neural embeddings model.

13. The system of claim 12, wherein the neural embeddings model uses cosine distances between words in the initial suggestion pool to identify candidate words.

14. The system of claim 8, wherein the initial suggestion pool includes words contained within the received context data.

15. A computer program product for artificial intelligence based context dependent spellchecking, the computer program product comprising a computer readable storage medium having program instructions embodied therewith, the program instructions executable by a computer to perform a method comprising:
    receiving context data to be used in spell checking;

receiving a user input, wherein the user input comprises an utterance;

identifying an out-of-vocabulary (OOV) word in the user input based, at least in part, on the context data;

identifying an initial suggestion pool of candidate words;

using a noisy channel approach comprising a language model and an error model to evaluate a probability that each of one or more of the candidate words of the initial suggestion pool is an intended word and should be used as a candidate for replacement of the OOV word;

identifying a second pool of candidate words based on the noisy channel approach, each candidate word within the second pool having a probability exceeding a threshold probability value;

performing, in response to the identifying, at least the language model or error model on the second pool of candidate words a second time;

selecting, based on results of the performing, one or more candidates for replacement of the OOV word; and outputting one or more candidates for replacement of the OOV word.

16. The computer program product of claim 15, wherein the context data is training data for a virtual assistant.

17. The computer program product of claim 16, wherein outputting the one or more candidates for replacement of the OOV word further comprises:

replacing the OOV word with one of the one or more candidates for replacement in the utterance of the user input; and providing the utterance containing the one of the one or more candidates for replacement to the virtual assistant.

18. The computer program product of claim 15, wherein the noisy channel approach uses the product of a language model distribution and an error model distribution.

19. The computer program product of claim 15, wherein the error model comprises a phonetic similarity model, a probabilistic edit distance model, and a neural embeddings model.

20. The computer program product of claim 19, wherein the neural embeddings model uses cosine distances between words in the initial suggestion pool to identify candidate words.

* * * * *